(12) United States Patent
Tamura et al.

(10) Patent No.: US 9,527,986 B2
(45) Date of Patent: Dec. 27, 2016

(54) CELLULOSE ACYLATE FILM, POLARIZING PLATE AND LIQUID CRYSTAL DISPLAY DEVICE

(71) Applicant: FUJIFILM Corporation, Tokyo (JP)

(72) Inventors: Akio Tamura, Kanagawa (JP); Kengo Asai, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 34 days.

(21) Appl. No.: 14/227,542

(22) Filed: Mar. 27, 2014

(65) Prior Publication Data
US 2014/0205770 A1   Jul. 24, 2014

Related U.S. Application Data

(63) Continuation of application No. PCT/JP2012/075231, filed on Sep. 28, 2012.

(30) Foreign Application Priority Data

Sep. 29, 2011   (JP) ................................ 2011-214748

(51) Int. Cl.
*C09K 19/00* (2006.01)
*C08L 1/10* (2006.01)
(Continued)

(52) U.S. Cl.
CPC .................. *C08L 1/10* (2013.01); *C08F 12/24* (2013.01); *C08F 212/14* (2013.01);
(Continued)

(58) Field of Classification Search
CPC .................. C08L 1/10; C08L 1/12; C08L 1/14; G02F 1/133528; C08J 5/18; C08J 2301/10; C08J 2301/12; C08J 2301/14;G02B 5/03–5/25; G02B 5/3033; C08F 12/24; C08F 212/08; C08F 212/14; C08F 212/32; Y10T 428/10; Y10T 428/1036; Y10T 428/1041
(Continued)

(56) References Cited

U.S. PATENT DOCUMENTS

2006/0275560 A1* 12/2006 Fukagawa et al. .......... 428/1.31

FOREIGN PATENT DOCUMENTS

JP   09-268209 A   10/1997
JP   09268209 A  * 10/1997
(Continued)

OTHER PUBLICATIONS

International Search Report issued in PCT/JP2012/075231 on Oct. 23, 2012.
(Continued)

*Primary Examiner* — Ruiyun Zhang
(74) *Attorney, Agent, or Firm* — Jean C. Edwards, Esq.; Edwards Neils LLC

(57) ABSTRACT

Provide a cellulose acylate film with small photoelastic coefficient, low moisture content and low haze, and a polarizing plate and a liquid crystal display device using the same. Also provided is a cellulose acylate film including at least cellulose acylate and a resin produced by hydrogenating a polymer containing a repeating unit derived from a monomer represented by the formula (1) below and hydroxyl group: in the formula (1), $R^1$ represents a hydrogen atom or $C_{1-5}$ alkyl group; each $R^2$ represents a hydrogen atom or substituent, at least one of $(R^2)$s being a hydroxyl group-containing substituent; moiety (A) may form, or does not necessarily form, a five- or six-membered ring; n represents an integer of 1 to 5, and when n is 2 or larger, the plurality of $(R^2)$s may be same with or different from each other.

(Continued)

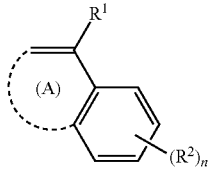

(1)

17 Claims, 2 Drawing Sheets

(51) Int. Cl.
  *C08J 5/18*   (2006.01)
  *C08F 12/24*  (2006.01)
  *C08F 212/14*  (2006.01)
  *C08L 1/12*   (2006.01)
  *C08F 212/32*  (2006.01)
  *G02B 5/30*   (2006.01)
  *G02F 1/1335*  (2006.01)

(52) U.S. Cl.
  CPC ............... *C08F 212/32* (2013.01); *C08J 5/18* (2013.01); *C08L 1/12* (2013.01); *G02B 5/3025* (2013.01); *G02B 5/3033* (2013.01); *C08J 2301/12* (2013.01); *G02F 1/133528* (2013.01); *Y10T 428/10* (2015.01); *Y10T 428/1036* (2015.01); *Y10T 428/1041* (2015.01); *Y10T 428/31971* (2015.04)

(58) Field of Classification Search
  USPC ............ 428/1.1, 1.3, 1.31, 1.6, 532; 524/37; 349/96, 158
  See application file for complete search history.

(56) References Cited

FOREIGN PATENT DOCUMENTS

| JP | 2003-096237 A | | 4/2003 |
|---|---|---|---|
| JP | 2003096237 A | * | 4/2003 |
| JP | 2009-126899 A | | 6/2009 |

OTHER PUBLICATIONS

Written Opinion issued in PCT/JP2012/075231 on Oct. 23, 2012.
International Preliminary Report on Patentability issued on Apr. 10, 2014, in connection with priority application No. PCT/JP2012/075231.
Decision of Refusal issued by the Japanese Patent Office (JPO) on Jun. 30, 2015 in connection with Japanese Patent Application No. 2013-536464.
First Office Action issued by the State Intellectual Property Office (SIPO) of China on Aug. 28, 2015 in connection with Chinese Patent Application No. 201280047861.4.
Office Action issued by the State Intellectual Property Office of China on Jul. 4, 2016, in connection with Chinese Patent Application No. 201280047861.4.
Official Action issued by the Japanese Patent Office on Apr. 7, 2015 in connection with Japanese Patent Application No. 2013-536464.

* cited by examiner

CELLULOSE ACYLATE FILM, POLARIZING PLATE AND LIQUID CRYSTAL DISPLAY DEVICE

The present application is a continuation of PCT/JP2012/075231 filed on Sep. 28, 2012, which was published under PCT article 21(2) in Japanese, and which in turn claims priority under 35 U.S.C. §119 of Japanese Patent Application No. 2011-214748, filed on Sep. 29, 2011.

TECHNICAL FIELD

The present invention relates to a cellulose acylate film which has a small photoelastic coefficient and is suppressed from elevation in the moisture content even under high temperature and high humidity conditions, as well as a polarizing plate and a liquid crystal display device using the same.

BACKGROUND ART

Liquid crystal display device is widely used as an image display device for TV set, personal computer and so forth, for its low power consumption and possibility of thinning. The liquid crystal display device is configured by providing polarizing plates on both sides of a liquid crystal cell, wherein the polarizing plate is configured by a polarizing film, in which iodine or dye is adsorbed and aligned, sandwiched from both sides with translucent resin layers. The translucent resin layers, directed to protect a polarizer, are preferably configured using cellulose acylate film.

Other than being used indoors like the TV sets and so forth, there have been increasing opportunities for the liquid crystal display device to be used outdoors, typically as incorporated into mobile devices. There has therefore been a demand for development of the liquid crystal display device more durable under high temperatures and high humidity than before. The cellulose acylate film is, however, liable to change in size due to absorption or desorption of water under variable temperature and humidity, and is therefore likely to be stressed. It has been becoming clear that the cellulose acylate film, when stressed, develops a large photoelastic coefficient, which results in leakage of light when a liquid crystal display screen is observed under a specific condition.

Accordingly, Patent Literature 1 for example proposes a cellulose ester film which contains a cellulose ester, and a polymer compound configured by polymerizing N-vinyl-2-pyrrolidone as a monomer. On the other hand, Patent Literature 2 proposes a cellulose ester film which contains a cellulose ester, and as a plasticizer a hydroxyl group-containing hydrogenated petroleum resin.

The cellulose ester film proposed in Patent Literature 1 is advantageous in terms of small leakage of light, and the cellulose ester film proposed in Patent Literature 2 is advantageous in terms of high translucency, low breeding-out, and high stability. Both of them have, however, been not fully satisfactory in terms of keeping good performance of polarizer, since the polarizer degraded with time when used for a long time under high temperatures and high humidity. Patent Literature 2 was also found to suffer from a problem of insufficient improvement in the leakage of light.

CITATION LIST

Patent Literature

[PATENT LITERATURE 1] JP-A-2009-126899
[PATENT LITERATURE 2] JP-A-2003-96237

SUMMARY OF THE INVENTION

Technical Problem

The present invention is conceived in consideration of the problems described above, and is focused to provide a cellulose acylate film having small photoelastic coefficient, low moisture content, and low haze, and a polarizing plate and a liquid crystal display device using the same.

Solution to Problem

The problem was solved by a means described below.
<1> A cellulose acylate film comprising at least cellulose acylate and a resin produced by hydrogenating a polymer containing a repeating unit derived from a monomer represented by the formula (1) below and hydroxyl group:

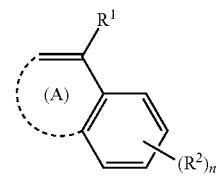

(1)

in the formula (1), $R^1$ represents a hydrogen atom or $C_{1-5}$ alkyl group; each $R^2$ represents a hydrogen atom or substituent, at least one of $(R^2)$s being a hydroxyl group-containing substituent; moiety (A) may form, or does not necessarily form, a five- or six-membered ring; n represents an integer of 1 to 5, and when n is 2 or larger, the plurality of $(R^2)$s may be same with or different from each other.
<2> The cellulose acylate film of <1>, wherein the resin is a copolymer which contains one or more species of the repeating units represented by the formula (1), and contains repeating units derived from two or more different species of monomers.
<3> The cellulose acylate film of <1> or <2>, comprising the repeating unit derived from a monomer represented by the formula (1), in which the unsaturated ethylenic bond in the moiety (A) does not link with the aromatic ring to thereby form no cyclic structure.
<4> The cellulose acylate film of any one of <1> to <3>, wherein $R^1$ represents a hydrogen atom or methyl group.
<5> The cellulose acylate film of any one of <1> to <4>, wherein the resin has a hydroxyl value of 10 to 200 mg/KOH/g.
<6> The cellulose acylate film of any one of <1> to <5>, wherein the resin has a weight-average molecular weight of 200 to 5,000.
<7> The cellulose acylate film of any one of <1> to <6>, having a photoelastic coefficient of $8.0 \times 10^{-12}$ $Pa^{-1}$ or smaller, a haze of 1% or smaller, and a moisture content at 25° C. and 80% relative humidity of 5% or less.
<8> The cellulose acylate film of any one of <1> to <7>, wherein the cellulose acylate satisfies the degree of acyl substitution given by the equation below:

$$1.5 \le A \le 3.0$$

wherein A represents the degree of acyl substitution.

<9> The cellulose acylate film of any one of <1> to <8>, wherein the cellulose acylate satisfies the degree of acetyl substitution given by the equation below:

$$2.0 \leq B \leq 3.0$$

wherein B represents the degree of acetyl substitution.
<10> A polarizing plate comprising at least a polarizer, and the cellulose acylate film of any one of <1> to <9>.
<11> A liquid crystal display device comprising at least a liquid crystal cell, and the polarizing plate of <10>.

Advantageous Effects of Invention

According to the present invention, it is now possible to provide a cellulose acylate film with small photoelastic coefficient, low moisture content and low haze, and a polarizing plate and a liquid crystal display device using the same.

DESCRIPTION OF EMBODIMENTS

Figure 1:
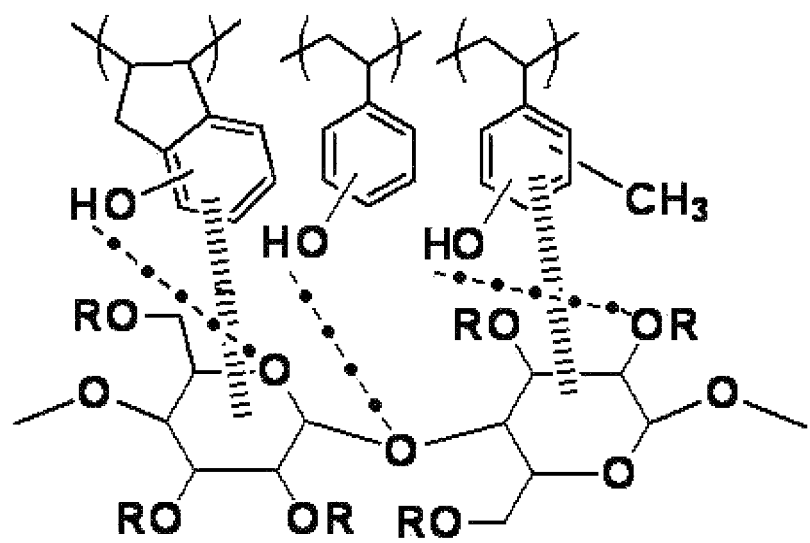
FIG. 1 A drawing schematically illustrating interactions between a hydroxyl group-containing aromatic hydrogenated petroleum resin and a cellulose acylate.

The contents of the invention are described in detail hereinunder. In this description, the numerical range expressed by the wording "a number to another number" means the range that falls between the former number indicating the lowermost limit of the range and the latter number indicating the uppermost limit thereof.
1. Cellulose Acylate Film The present invention relates to a cellulose acylate film which contains at least cellulose acylate, and a resin produced by hydrogenating a polymer containing a repeating unit derived from a monomer represented by the formula (1) below and hydroxyl group (hydroxyl group-containing aromatic hydrogenated petroleum resin). In the present invention, by adding the hydroxyl group-containing aromatic hydrogenated petroleum resin to cellulose acylate, it now becomes possible to reduce the photoelastic coefficient and the moisture content, without degrading the haze level. While details of a mechanism by which the effect described above may be obtained remain unclear, our presumption is as depicted in FIG. 1. For example, as illustrated in FIG. 1, hydroxyl groups owned by the hydroxyl group-containing aromatic hydrogenated petroleum resin, and oxygen atoms in the cellulose molecule establish an inter-molecular interaction (dashed line in FIG. 1), and the cyclic structure owned by the hydroxyl group-containing aromatic hydrogenated petroleum resin and the glucopyranose rings of cellulose establish a strong interaction (dotted line in FIG. 1), to thereby intensify the hydrophobicity inside the cellulose. As compared with the case of norbornene resin in which the main chain and the side chain are integrated, the hydroxyl group-containing aromatic hydrogenated petroleum resin has the hydroxyl group-containing aromatic rings substituted on the side chains, so as to give a proper flexibility to a bond between the main chain and side chain, just like in polystyrene, thereby the hydroxyl group-containing aromatic hydrogenated petroleum resin may exist around cellulose acylate efficiently.

With this configuration, the cellulose acylate is supposed to be much effectively suppressed from causing micro-deformation in the main chain when stressed, and much effectively reduced in the photoelastic coefficient. It was also supposed that the hydroxyl group-containing aromatic hydrogenated petroleum resin became more readily accessible at around the main chain of the cellulose acylate, whereas water molecule became less accessible at around the main chain of the cellulose acylate, so that a strong hydrophobic field is created as a result of weakened interaction between water and cellulose acylate, thereby the effect of reducing the moisture content is enhanced.

Materials usable for the cellulose acylate film of the present invention will be detailed below.
1-1. Resin Produced by Hydrogenating Polymer Containing Repeating Unit Derived from Monomer Represented by Formula (1) and Hydroxyl group (Hydroxyl group-Containing Aromatic Hydrogenated Petroleum Resin)

The cellulose acylate film of the present invention contains a resin produced by hydrogenating a polymer containing a repeating unit derived from a monomer represented by the formula (1) below and hydroxyl group.

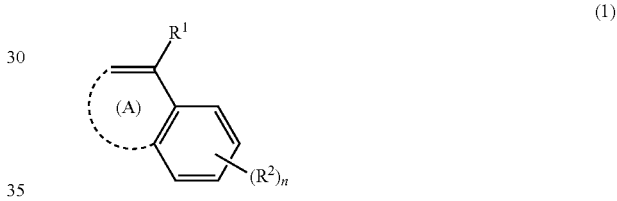

In the formula (1), $R^1$ represents a hydrogen atom or $C_{1-5}$ alkyl group; each $R^2$ represents a hydrogen atom or substituent, where at least one of $(R^2)$s represents a hydroxyl group-containing substituent; moiety (A) may form, or does not necessarily form, a five- or six-membered ring ((A) represents an atomic group necessary for forming a five- or six-membered ring, or may have no atom to form no ring); n represents an integer of 1 to 4, and when n is 2 or larger, the plurality of $(R^2)$s may be same with or different from each other.

$R^1$ represents a hydrogen atom or $C_{1-5}$ alkyl group. $R^1$ is preferably a hydrogen atom or $C_{1-3}$ alkyl group, and more preferably a hydrogen atom or methyl group.

$R^2$ represents a hydrogen atom or substituent. Examples of the substituent include alkyl group [preferably $C_{1-10}$ alkyl group (more preferably $C_{1-4}$ alkyl group), such as methyl, ethyl, isopropyl, t-butyl, pentyl, heptyl, 1-ethylpentyl, benzyl, 2-ethoxyethyl, 1-carboxy methyl, etc.]; alkenyl group (preferably $C_{2-20}$ alkenyl group, for example, vinyl, allyl, oleyl, etc.); alkynyl group (preferably $C_{2-20}$ alkynyl group, for example, ethynyl, butadienyl, phenylethynyl, etc.); cycloalkyl group (preferably $C_{3-20}$ cycloalkyl group, for example, cyclopropyl, cyclopentyl, cyclohexyl, 4-methylcyclohexyl, etc.); aryl group (preferably $C_{6-26}$ aryl group, for example, phenyl, 1-naphthyl, 4-methoxyphenyl, 2-chlorophenyl, 3-methylphenyl, etc.); heterocyclic group (preferably $C_{2-20}$ heterocyclic group, for example, 2-pyridyl, 4-pyridyl, 2-imidazolyl, 2-benzoimidazolyl, 2-thiazolyl, 2-oxazolyl, etc.); alkoxy group (preferably $C_{1-20}$ alkoxy group, for example, methoxy, ethoxy, isopropyloxy, benzyloxy, etc.); aryloxy group (preferably $C_{6-26}$ aryloxy group, for example, phenoxy, 1-naphthyloxy, 3-methylphenoxy, 4-methoxyphenoxy, etc.); alkoxycarbonyl group (preferably $C_{2-20}$ alkoxycarbonyl group, for example, ethoxycarbonyl, 2-ethylhexyloxycarbonyl, etc.); amino group (preferably $C_{0-20}$ amino group, for example, amino, N,N-dimethylamino, N,N-diethylamino, N-ethylamino, anilino, etc.); sulfonamide group (preferably $C_{0-20}$ sulfonamide group, for example, N,N-dimethylsulfonamide, N-phenylsulfonamide, etc.); acyloxy group (preferably $C_{1-20}$ acyloxy group, for example, acetyloxy, benzoyloxy, etc.); carbamoyl group (preferably $C_{1-20}$ carbamoyl group, for example, N,N-dimethylcarbamoyl, N-phenylcarbamoyl, etc.); acylamino group (preferably $C_{1-20}$ acylamino group, for example, acetylamino, benzoylamino, etc.); cyano group, or halogen atom (for example, fluorine atom, chlorine atom, bromine atom, iodine atom, etc.); and hydroxyl group. $R^2$ is preferably a hydroxyl group, hydrogen atom or $C_{1-10}$ alkyl group, and is more preferably hydroxyl group or methyl group. $R^2$, when being a substituent, may further have one or more substituents listed above.

$R^2$ necessarily contains at least one hydroxyl group. For example, if n is 1, then $R^2$ is a hydroxyl group, and if n is 2 or larger, it suffices that at least one $R^2$ is a hydroxyl group. The hydroxyl group may be bound to an alkylene chain, polyoxyalkylene chain or the like.

The moiety (A) represents an atomic group necessary for forming a five- or six-membered ring, or, the unsaturated ethylenic bond in the moiety (A) does not always necessarily link with the aromatic ring to form a cyclic structure (the number of atoms may be 0, and therefore a ring is not formed). The moiety (A) may be an aromatic ring, and is preferably a five-membered aliphatic ring, a six-membered aliphatic ring, or has no atom.

n represents an integer of 1 to 4, preferably 1 to 3, and more preferably 1 to 2.

In the present invention, the resin may be a copolymer which contains one or more species of repeating units represented by the formula (1), and contains a repeating unit derived from two or more different species of monomers.

The copolymer preferably contains a repeating unit derived from a monomer represented by the formula (1) in which the moiety (A) has no atom, and therefore forms no ring. Compositional ratio of the monomer represented by the formula (1) in which the moiety (A) has no atom and forms no ring, and the monomer represented by the formula (1) in which the moiety (A) forms a ring, is preferably (3 to 9):(7 to 1), and more preferably (3 to 8):(7 to 2).

Specific examples of the polymer containing the repeating unit derived from the monomer represented by the formula (1) and containing hydroxyl group will be shown below, without limiting the present invention.

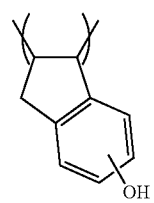
(1-1)

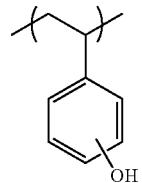
(1-2)

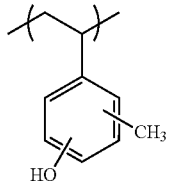
(1-3)

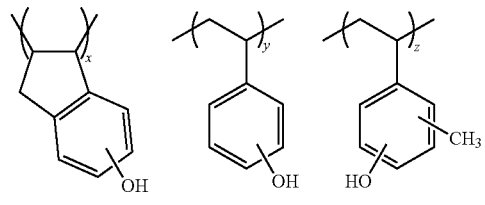
x = 5 y = 3 z = 2

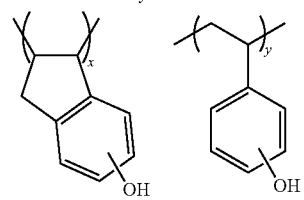
x = 4 y = 6

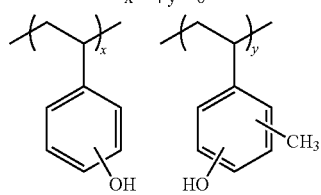
x = 7 y = 3

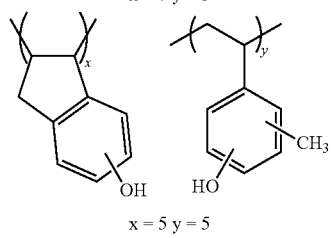
x = 5 y = 5

The hydroxyl group-containing aromatic hydrogenated petroleum resin preferably has a mass-average molecular weight of 200 to 5,000, more preferably 300 to 4,000, and particularly 400 to 3,000.

If the molecular weight is smaller than 200, the resin may vaporize off from the film in some cases, and if it exceeds 5,000, the haze may increase.

The molecular weight herein is a value from measurement by GPC (gel permeation chromatography) unless otherwise specifically noted, and is given as polystyrene equivalent mass-average molecular weight. Gel packed in a column used in the GPC process preferably has an aromatic compound as the repeating unit, and is exemplified by a gel composed of styrene-divinylbenzene copolymer. Two to six columns are preferably used in a serially connected manner. Solvent used therefor is exemplified by ether-based solvents such as tetrahydrofuran, and amide-based solvents such as N-methylpyrrolidinone. The measurement is preferably conducted at the flow rate of solvent ranging from 0.1 to 2 mL/min, and most preferably from 0.5 to 1.5 mL/min. In these ranges, the measurement will be conducted in a more efficient manner, without applying unnecessarily heavy load to the device. The measurement is preferably conducted at a temperature of 10 to 50° C., and most preferably 20 to 40° C. The columns and carrier used herein is properly selectable depending on physical properties of the compound to be measured.

While not specifically limited, the amount of addition of the hydroxyl group-containing aromatic hydrogenated petroleum resin is preferably 1.0 to 200 parts by mass, more preferably 1.0 to 100 parts by mass, and particularly 2.0 to 100 parts by mass, per 100 parts by mass of cellulose acylate.

If the amount of addition is less than 1.0 part by mass, the photoelastic coefficient and moisture content of the film would not effectively be reduced, whereas if it exceeds 200 parts by mass, the haze would increase.

The hydroxyl group-containing aromatic hydrogenated petroleum resin preferably has a hydroxyl value of 10 to 200 mg/KOH/g, more preferably 15 to 180 mg/KOH/g, and particularly 20 to 180 mg/KOH/g.

If the hydroxyl value is smaller than 10 mg/KOH/g, the haze would increase, whereas if it exceeds 200 mg/KOH/g, the moisture content would not effectively be reduced.

The hydroxyl group-containing aromatic hydrogenated petroleum resin may be synthesized by any of publicly known methods, specifically by a method described in JP-B-3687079, or commercially available.

1-2. Cellulose Acylate

In the present invention, cellulose acylate is used as a main ingredient of the film. In this specification, "main ingredient" in an embodiment where a single species of ingredient is used as a source material means that ingredient per se, meanwhile in an embodiment where two or more species of ingredients are used, it means an ingredient having the largest mass fraction.

Examples of the cellulose used as a starting material in preparation of cellulose acylate materials used for production of the cellulose acylate film include cotton linter and wood pulp (broadleaf pulp and coniferous pulp). Any cellulose acylate derived from such cellulose being the starting material may be used, and different cellulose acylates can be used in combination in some cases. The details of the cellulose being the starting material are disclosed by, for example, Marusawa., Uda. (1970). *Plastic Zairyo Kouza* (17), *Cellulosic Resin*. Nikkan Kogyo Shimbun Ltd. and *Hatsumei Kyokai Disclosure Bulletin* 2001-1745 (pp. 7-8).

A single species, or two or more species, of acyl groups may be used as the acyl group in cellulose acylate used in the cellulose acylate film. Cellulose acylate used for the cellulose acylate film preferably has a $C_{2-4}$ acyl group as a substituent. For the case where two or more species of acyl groups are used, one of them is preferably an acetyl group, and the $C_{2-4}$ acyl group is preferably a propionyl group or butyryl group. With these sorts of cellulose acylate, a solution with good solubility may be prepared, and in particular, a good solution may be prepared when a chlorine-free organic solvent is used. It becomes also possible to prepare a solution further small in viscosity and easy to filter.

First, the cellulose acylate preferably used for the present invention will be detailed. β-1,4-bonded glucose units composing cellulose have free hydroxyl groups on the 2-position, 3-position and 6-position. The cellulose acylate is a polymer obtained by acylating a part of, or all of these hydroxyl groups. The degree of acyl substitution means the total of ratios of acylation of hydroxyl groups on the 2-position, 3-position and 6-position of cellulose (100% acylation at the individual positions gives a degree of substitution of 1).

The total degree of acyl substitution (A) of the cellulose acylate is preferably 1.5 or larger and 3 or smaller ($1.5 \leq A \leq 3.0$), more preferably 2.0 or larger and 2.97 or smaller, furthermore preferably 2.5 or larger and smaller than 2.97, and particularly 2.70 or larger and 2.95 or smaller.

$C_2$ or longer acyl group in the cellulose acylate may be either of aliphatic group and allyl group, without special limitation. It may be, for example, alkylcarbonyl ester, alkenylcarbonyl ester, aromatic carbonyl ester, or aromatic alkylcarbonyl ester of cellulose, wherein each of them may have a further substituted group. Preferable examples include acetyl group, propionyl group, butanoyl group, heptanoyl group, hexanoyl group, octanoyl group, decanoyl group, dodecanoyl group, tridecanoyl group, tetradecanoyl group, hexadecanoyl group, octadecanoyl group, isobutanoyl group, tert-butanoyl group, cyclohexane carbonyl group, oleoyl group, benzoyl group, naphthylcarbonyl group, and cinnamoyl group. Among them, more preferable are acetyl group, propionyl group, butanoyl group, dodecanoyl group, octadecanoyl group, tert-butanoyl group, oleoyl group, benzoyl group, naphthylcarbonyl group and cinnamoyl group, more preferable are acetyl group, propionyl group and butanoyl group (when the acyl group has 2 to 4 carbon atoms), and most preferable is acetyl group (when cellulose acylate is cellulose acetate).

If all acyl groups of the cellulose acylate are acetyl groups, the total degree of acetyl substitution (B) is preferably 2.0 or larger and 3 or smaller ($2.0 \leq B \leq 3.0$), more preferably 2.0 or larger and 2.97 or smaller, furthermore preferably 2.5 or larger and smaller than 2.97, and particularly 2.70 or larger and 2.95 or smaller.

In the acylation of cellulose, if acid anhydride or acid chloride is used as an acylating agent, then organic solvent as a reaction solvent is an organic acid, for example, acetic acid, methylene chloride or the like.

If the acylating agent is acid anhydride, the catalyst is preferably a protonic catalyst such as sulfuric acid, meanwhile, if the acylating agent is acid chloride (for example, $CH_3CH_2COCl$), a basic compound is used.

In a most general industrial method of synthesizing a mixed aliphatic ester of cellulose, cellulose is acylated with a mixed organic acid component which contains fatty acids corresponded to acetyl group and other acyl group(s) (acetic acid, propionic acid, valeric acid, etc.) or acid anhydrides of them.

The cellulose acylate may be synthesized by a method described, for example, in JP-A-H10-45804.

In the film of the present invention, content of the cellulose acylate is preferably 5 to 99% by mass in the whole solid content from the viewpoint of moisture permeability, more preferably 20 to 99% by mass, and particularly preferably 50 to 95% by mass.

1-3. Other Additives

The cellulose acylate film may also be added with additives such as polycondensed polymer; retardation modifier (retardation developer and retardation reducing agent); plasticizer such as phthalic ester or phosphoric ester; UV absorber; antioxidant; and matting agent.

(Polycondensed Polymer)

The cellulose acylate film preferably contains the polycondensed polymer, from the viewpoint of reducing the haze.

The polycondensed polymer, as an additive to the cellulose acylate film, is widely selectable from general high molecular weight additives. The content of the additive is preferably 1 to 35% by mass relative to the cellulosic resin, more preferably 4 to 30% by mass, and furthermore preferably 10 to 25% by mass.

The high molecular weight additives used as the polycondensed polymer for the cellulose acylate film are those having a repeating unit in the compound per se, and preferably have a number-average molecular weight of 700 to 10,000. The high molecular weight additives also function to accelerate vaporization of solvent or to reduce the content of residual solvent. They still also develop useful effects from the viewpoint of modification of the film, including improvement in the mechanical properties, provision of flexibility, provision of resistance to water absorption, and reduction in water permeability.

The high molecular weight additives, which are the polycondensed polymer used in the present invention, more preferably have a number-average molecular weight of 700 to 8,000, furthermore preferably 700 to 5,000, and particularly 1,000 to 5,000.

The high molecular weight additives, which are the polycondensed polymer used in the present invention, will be detailed referring to specific examples. Of course, the high molecular weight additives as the polycondensed polymer are not limited to these examples.

The polycondensed polymer is preferably a phosphoric ester-free compound. Note that the "phosphoric ester-free compound" means an ester-based compound containing no phosphoric ester.

The polymer-based additive as the polycondensed polymer is exemplified by polyester-based polymer (aliphatic polyester-based polymer, aromatic polyester-based polymer, etc.), and copolymer of polyester-based component and other component(s). Preferable are aliphatic polyester-based polymer, aromatic polyester-based polymer, copolymer of polyester-based polymer (aliphatic polyester-based polymer, aromatic polyester-based polymer, etc.) and acrylic polymer, and copolymer of polyester-based polymer (aliphatic polyester-based polymer, aromatic polyester-based polymer, etc.) and styrene-based polymer. It is more preferably a polyester compound containing at least an aromatic ring as one of the copolymerizable components.

The aliphatic polyester-based polymer is obtained by a reaction between a $C_{2-20}$ aliphatic dicarboxylic acid, and at least one or more species of diols selected from $C_{2-12}$ aliphatic diols and $C_{4-20}$ alkyl ether diols. While both terminals of the reaction product may remain intact as reacted, they may further be reacted with monocarboxylic acids, monoalcohols, or phenols to conduct so-called terminal blocking. The terminal blocking is conducted so as to avoid inclusion of, in particular, free carboxylic acids, from the viewpoint of storability. Dicarboxylic acid used for the polyester-based polymer in the present invention is preferably a $C_{4-20}$ aliphatic dicarboxylic acid residue or a $C_{8-20}$ aromatic dicarboxylic acid residue.

The aromatic polyester-based polymer used in the present invention is preferably the above-mentioned polyester which is combined with at least one species of each of aromatic dicarboxylic acids or aromatic diols, wherein the combination is not specifically limited, and several species of the individual components may be combined without problem. In the present invention, as described previously, it is particularly preferable to use the high molecular weight additive having the terminal thereof blocked, by the method mentioned above, with an alkyl group or aromatic group.

(Retardation Reducing Agent)

In the present invention, the retardation reducing agent is widely selectable from phosphoric ester-based compound, and compounds other than phosphoric ester-free compounds which are publicly known as additives for the cellulose acylate film.

Polymer-based retardation reducing agent is selectable from phosphate-based, polyester-based polymer, styrene-based polymer, acrylic polymer and copolymer of them, wherein acrylic polymer and styrene-based polymer are preferable. At least one species of polymer having a negative intrinsic birefringence, such as styrene-based polymer and acrylic polymer, is preferably contained.

Low molecular weight retardation reducing agents, which belong to compounds other than the phosphoric ester-free compound, are exemplified as follows. They may be solid or oily substances. In other words, there are no special limitations on the melting point and boiling point. For example, UV absorbing materials with 20° C. or lower and 20° C. or higher, or deterioration inhibitors of the same are usable in a mixed manner. Furthermore, infrared absorbing dyes are described in, for example, JP-A-2001-194522. Time of addition of the additives is arbitrary in the process of preparing the cellulose acylate solution (dope), or the additives may be added in an additional step provided succeeding to the final step of preparation of the dope. Amounts of addition of the individual materials are not specifically limited, so long as their functions are developed.

The low molecular weight retardation reducing agents, which belong to compounds other than the phosphoric ester-free compound, are detailed in paragraphs [0066] to [0085] of JP-A-2007-272177, but not specifically limited thereto.

The compounds represented by the formula (1) in the paragraphs [0066] to [0085] of JP-A-2007-272177 may be prepared by a method described below.

The compounds represented by the formula (1) in the gazette are obtainable by a condensation reaction between sulfonyl chloride derivatives and amine derivatives.

Compounds represented by the formula (2) in JP-A-2007-272177 are obtainable by a dehydration condensation between carboxylic acids and amines using a condensing agent (dicyclohexyl carbodiimide (DCC), for example), or by a substitution reaction between carboxylic acid chloride derivatives and amine derivatives.

The retardation reducing agent is preferably a Rth reducing agent, from the viewpoint of implementing an appropriate Nz factor. Among the retardation reducing agents, Rth reducing agent is exemplified by acrylic polymer and styrene-based polymer, and low molecular weight compounds represented by the formulae (3) to (7) in JP-A-2007-272177. Among them, acrylic polymer and styrene-based polymer are preferable, and acrylic polymer is more preferable.

The amount of addition of the retardation reducing agent is preferably 0.01-30% by mass relative to the cellulosic resin, more preferably 0.1 to 20% by mass, and particularly 0.1 to 10% by mass.

With the amount of addition adjusted to 30% by mass or less, the compatibility with the cellulosic resin may be improved, and thereby whitening may be suppressed. When two or more species of the retardation reducing agents are used, the total amount preferably falls in these ranges.

(Retardation Developer)

The cellulose acylate film preferably contains at least one species of retardation developer, in view of developing a retardation value. The retardation developer is exemplified by those composed of rod-like or discotic compound, and those with retardation developing performance among from the phosphoric ester-free compounds, without special limitation. Among from the rod-like or discotic compound, those having at least two aromatic rings are preferably used as the retardation developer.

The amount of addition of the retardation developer composed of the rod-like compound is preferably 0.1 to 30 parts by mass, and more preferably 0.5 to 20 parts by mass, per 100 parts by mass of the polymer component which contains the cellulose acylate. The content of the discotic compound contained in the retardation developer is preferably less than 3 parts by mass, more preferably less than 2 parts by mass, and particularly preferably less than 1 part by mass, per 100 parts by mass of the cellulose acylate.

The discotic compound, which is superior to the rod-like compound in terms of developability of Rth retardation, is preferably used for the case where a particularly large Rth retardation is necessary. Two or more species of the retardation developers may be used in combination.

The retardation developer preferably shows a maximum absorption in the wavelength range from 250 to 400 nm, and preferably shows substantially no absorption in the visible light region.

The retardation developer is detailed in Japanese Journal of Technical Disclosure No. 2001-1745, p. 49.

(Plasticizer)

Also a number of compounds, known as a plasticizer for cellulose acrylate, are usable as the plasticizer in the present invention. The plasticizer usable herein includes phosphoric ester or carboxylic ester, carbohydrate derivative, and so forth. Examples of the phosphoric ester include triphenyl phosphate (TPP) and tricresyl phosphate (TCP). The carboxylic ester is represented by phthalic ester and citric ester. Examples of the phthalic ester include dimethyl phthalate (DMP), diethyl phthalate (DEP), dibutyl phthalate (DBP), dioctyl phthalate (DOP), diphenyl phthalate (DPP) and diethylhexyl phthalate (DEEP). Examples of the citric ester include triethyl O-acetylcitrate (OACTE) and tributyl O-acetylcitrate (OACTB). Examples of other carboxylic ester include butyl oleate, methyl acetyl ricinoleate, dibutyl sebacate, and various trimellitates. Preferably used are phthalic ester-based plasticizers (DMP, DEP, DBP, DOP, DPP, DEHP), wherein DEP and DPP are particularly preferable.

The carbohydrate derivative is preferably any of monosaccharides, or carbohydrate derivatives having 2 to 10 monosaccharide units (also referred to as "carbohydrate derivative-based plasticizer, hereinafter).

The carbohydrate derivative-based plasticizer is exemplified by maltose octaacetate, cellobiose octaacetate, sucrose octaacetate, sucrose acetate isobutyrate, xylose tetrapropionate, glucose pentapropionate, fructose pentapropionate, mannose pentapropionate, galactose pentapropionate, maltose octapropionate, cellobiose octapropionate, sucrose octapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and solbitol hexabenzoate. The carbohydrate derivative-based plasticizers usable in the present invention are, however, not limited thereto. These plasticizers may be used independently, or in combination of two or more species.

(Antioxidant)

In the present invention, the cellulose acylate solution may be added with any of publicly known antioxidants, for example, phenolic or hydroquinone-based antioxidant such as 2,6-di-tert-butyl-4-methyl phenol, 4,4'-thiobis(6-tert-butyl-3-methylphenol), 1,1'-bis(4-hydroxyphenyl)cyclohexane, 2,2'-methylenebis(4-ethyl-6-tert-butylphenol), 2,5-di-tert-butylhydroquinone, and pentaerythrityl-tetrakis[3-(3,5-di-tert-butyl-4-hydroxyphenyl)propionate]. It is further preferable to add phosphorus-containing antioxidant such as tris(4-methoxy-3,5-diphenyl)phosphite, tris(nonylphenyl)phosphite, tris(2,4-di-tert-butylphenyl)phosphite, bis(2,6-di-tert-butyl-4-methylphenyl)pentaerythritol diphosphite, and bis(2,4-di-tert-butylphenyl)pentaerythritol diphosphite. The amount of addition of the antioxidant is preferably 0.05 to 5.0 parts by mass per 100 parts by mass of the cellulosic resin.

(UV Absorber)

In the present invention, the cellulose acylate solution may be added with an UV absorber, from the viewpoint of preventing deterioration of the polarizing plate, liquid crystal or the like. The UV absorber preferably used herein are those having good UV absorptivity in the wavelength range of 370 nm or less, and also from the viewpoint of good display performance on the liquid crystal display, showing less absorption of visible light in the wavelength range of 400 nm or more. Specific examples of the UV absorber preferably used in the present invention include hindered phenol-based compound, hydroxybenzophenone-based compound, benzotriazole-based compound, salycilate-based compound, benzophenone-based compound, cyano acrylate-based compound, and nickel complex salt-based compound. The hindered phenolic compound is exemplified by 2,6-di-tert-butyl-p-cresol, pentaerythrityl-tetrakis[3-(3,5-di-tert-butyl-4-hydroxyphenyl)propionate], N,N'-hexamethylenebis(3,5-di-tert-butyl-4-hydroxy-hydroxycinnamide), 1,3,5-trimethyl-2,4,6-tris(3,5-di-tert-butyl-4-hydroxybenzyl)benzene, and tris-(3,5-di-tert-butyl-4-hydroxybenzyl)isocyanurate. The benzotriazole-based compound is exemplified by 2-(2'-hydroxy-5'-methylphenyl)benzotriazole, 2,2-methylenebis(4-(1,1,3,3-tetramethylbutyl)-6-(2H-benzotriazole-2-yl)phenol), (2,4-bis-(n-octylthio)-6-(4-hydroxy-3,5-di-tert-butylanilino)-1,3,5-triazine, triethyleneglycol-bis[3-(3-tert-butyl-5-methyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2-(2'-hydroxy-3',5'-di-tert-butylphenyl)-5-chlorobenzotriazole, 2-(2'-hydroxy-3',5'-di-tert-amylphenyl)-5-chlorobenzotriazole, 2,6-di-tert-butyl-p-cresol, and pentaerythrityl-tetrakis[3-(3,5-di-tert-butyl-4-hydroxyphenyl)propionate]. The amount of addition of the UV blocker is preferably 1 ppm to 1.0% on the weight basis in the whole optical film, and more preferably 10 to 1,000 ppm.

(Matting Agent)

The cellulose acylate film may be added with a matting agent, from the viewpoint of film slippage and safety in the manufacturing. The matting agent may be an inorganic compound or an organic compound.

Preferable examples of the inorganic compound composing the matting agent include silicon-containing inorganic compounds (for example, silicon dioxide, calcined calcium silicate, hydrated calcium silicate, aluminum silicate, magnesium silicate), titanium oxide, zinc oxide, aluminum oxide, barium oxide, zirconium oxide, strontium oxide, antimony oxide, tin oxide, tin/antimony oxide, calcium carbonate, talc, clay, calcined kaolin, and calcium phosphate. The silicon-containing inorganic compound and zirconium oxide are more preferably used, wherein it is particularly preferable to use silicon dioxide since it can reduce the turbidity of the cellulose acylate film. Silicon dioxide particles are commercially available typically under the trade names of Aerosil R972, R974, R812, 200, 300, R202, OX50 and TT600 (all from Nippon Aerosil Co., Ltd.). Zirconium oxide particles are commercially available typically under the trade names of Aerosil R976 and R811 (all from Nippon Aerosil Co., Ltd.).

Preferable examples of the organic compound composing the matting agent include polymers such as silicone resin, fluorine-containing resin and acrylic resin. Among them, silicone resin is preferably used. Among the silicone resins, those having a three-dimensional network structure are preferably used, which are commercially available typically under the trade names of Tospearl 103, Tospearl 105, Tospearl 108, Tospearl 120, Tospearl 145, Tospearl 3120 and Tospearl 240 (all from Toshiba Silicone Co., Ltd.).

The matting agent may be added to the cellulose acylate solution by an arbitrary method not specifically limited, so long as a desired cellulose acylate solution may be obtained. For example, the additive may be added in the process of mixing the cellulose acylate and the solvent, or may be added after the cellulose acylate and solvent were mixed to produce a mixed solution. Still alternatively, the additive may be added and mixed immediately before the dope is cast, by a so-called, just-in-time addition process, using an on-line screw kneader provided for the mixing. More specifically, a static mixer such as inline mixer is preferably used, wherein the inline mixer is preferably, for example, a static mixer SWJ (Toray static inline mixer, "Hi-Mixer") (from Toray Engineering Co., Ltd.). As for the inline addition, JP-A-2003-053752 describes a method of manufacturing a cellulose acylate film directed to avoid non-uniformity in density and coagulation of matting particles, in which distance L between the end of a nozzle through which an addition solution with a different composition is added to a main dope, and the base end of the inline mixer, is set to not more than 5 times the inner diameter of a pipe for feeding a main ingredient. The description also deals with a more preferable embodiment in which the distance L between the open end of a feeding nozzle through which an addition solution with a different composition is added to a main dope, and the base end of the inline mixer, is set to not more than 10 times the inner diameter (d) of the open end of the feeding nozzle, wherein the inline mixer is a static non-agitated inline mixer or dynamic agitated inline mixer. More specifically, it is disclosed that the ratio of flow rate given by (main dope of cellulose acylate film)/(inline addition liquid) is 10/1 to 500/1, and preferably 50/1 to 200/1. Also JP-A-2003-014933, which is directed to a retardation film which is low in bleed-out of additives, free from inter-layer separation, good in slippage and translucency, describes a method of adding additives, stating that the additive may be added into a melting pot, an additive or a solution having the additive dissolved or dispersed therein may be added on the way from the melting pot to a co-casting die into the dope being fed, wherein in the latter case, a mixing unit such as static mixer is preferably provided for an improved mixing performance.

In the cellulose acylate film, the matting agent will not increase the haze of the film if added not so much, and is less likely to cause nonconformities such as lowered contrast or occurrence of bright spot when actually incorporated into LCD. Meanwhile, if the amount of addition is not too small, squeaking may be suppressed and scratch resistance may be ensured. From these points of view, the amount of addition is preferably 0.05 to 1.0% by mass.

1-4. Configuration and Physical Properties of Cellulose Acylate Film (Layer Configuration of Film)

The cellulose acylate film may be single-layered, or may be a laminate of two or more layers.

The cellulose acylate film, when configured as a laminate of two or more layers, is preferably two-layered or three-layered, and more preferably three-layered. When configured as a three-layered film and manufactured by solution casting, the film of the present invention preferably has a layer brought into contact with the metal support (referred to as support-contacting layer, or skin layer B, hereinafter), a layer directed to the interface with the air on the opposite side of the metal support (referred to as air-contacting layer, or skin layer A, hereafter) and a single core layer held in between (referred to as base layer, hereinafter). In short, the film of the present invention preferably has a three-layered structure given by (skin layer B)/(core layer)/(skin layer A).

The skin layer A and the skin layer B are generally referred to as skin layer (or surficial layer).

In the cellulose acylate film, the degree of acyl substitution in the individual layers may be same, or a plurality of cellulose acylates may be contained in a single layer, wherein it is preferable that the degree of acyl substitution of the cellulose acylate is kept constant in all of the individual layers, from the viewpoint of controlling the optical characteristics. When the cellulose acylate film has the three-layered structure, the cellulose acylate contained in the surficial layers on both sides preferably has the same degree of acyl substitution, from the viewpoint of manufacturing cost.

(Elastic Modulus)

The film of the present invention has an elastic modulus which is sufficient for practical use. While not specifically limited, the elastic modulus ranges from 1.0 GPa to 5.0 GPa from the viewpoint of adaptability to manufacturing and readiness of handling, and more preferably 2.0 GPa to 4.5 GPa. The hydroxyl group-containing aromatic hydrogenated petroleum resin, when added into the cellulose acylate, acts to make the film hydrophobic to thereby improve the elastic modulus, which is recognized as another advantage of the present invention.

(Photoelastic Coefficient)

The film of the present invention preferably has an absolute value of the photoelastic coefficient of $8.0 \times 10^{-12}$ $m^2/N$ or smaller, more preferably $6 \times 10^{-12}$ $m^2/N$ or smaller, and furthermore preferably $5 \times 10^{-12}$ $m^2/N$ or smaller. By reducing the photoelastic coefficient of the resin film, the resin film, when incorporated as the polarizing plate protective films into the liquid crystal display device, will suppress non-uniformity in display screen under high temperatures and high humidity. The photoelastic coefficient is measured and calculated by the method described below, unless otherwise specifically noted. While not specifically limited, the lower limit value of the photoelastic coefficient is practically $0.1 \times 10^{-12}$ $m^2/N$ or larger.

The film is cut into pieces of 3.5 cm×12 cm in size, Re values under the individual load values of 0 g, 250 g, 500 g, 1,000 g and 1,500 g were measured using an ellipsometer (M150, from JASCO Corporation), and photoelastic coefficient was determined based on the slope of a straight line representing a relation between stress and Re.

(Moisture Content)

Moisture content of the resin film may be evaluated by measuring equilibrium moisture content at constant temperature and constant humidity. The specimens were allowed to stand at constant temperature and constant humidity for 24 hours, the moisture content of the specimens which reached the equilibrium state was measured by the Karl Fischer process, and equilibrium moisture content was calculated by dividing the water content (g) by the mass of specimen (g).

The film of the present invention preferably has a moisture content at 25° C., 80% relative humidity of 5% by mass or smaller, more preferably 4% by mass or smaller, and furthermore preferably less than 3% by mass. By reducing the moisture content of the film, the resin film, when incorporated as the polarizing plate protective films into the liquid crystal display device, will suppress non-uniformity in display screen under high temperatures and high humidity. While not specifically limited, the lower limit value of the moisture content is practically 0.1% by mass or larger.

(Moisture Permeability)

Moisture permeability of the resin film may be evaluated in compliance with JIS Z0208 "Testing Methods for Determination of the Water Vapor Transmission Rate (Dish Method)", in an environment at 40° C. and 90% RH, by measuring the weight of water vapor which transmits through an sample over 24 hours and converting the measured value to the value per 1-m$^2$ of the sample.

The resin film of the present invention preferably has a moisture permeability of 500 to 2,000 g/m$^2$·day, more preferably 900 to 1,300 g/m$^2$·day, and particularly 1,000 to 1,200 g/m$^2$·day.

(Haze)

The cellulose acylate film preferably has a haze of 1% or smaller, more preferably 0.7% or smaller, and particularly 0.5% or smaller. By adjusting the haze to the upper limit values or lower, the film will successfully be improved in the translucency and will be made more readily usable as an optical film. Unless otherwise specifically noted, the haze is measured and calculated according to the method used in Examples which will be described later. While not specifically limited, the lower limit value of the haze is practically 0.001% or above.

(Film Thickness)

The cellulose acylate film preferably has an average thickness of 30 to 100 µm, more preferably 30 to 80 µm, and furthermore preferably 30 to 70 µm. With the thickness adjusted to 30 µm or above, the film will be handled more readily and successfully, when manufactured into a web. With the thickness adjusted to 70 µm or below, the film will be durable against changes in moisture, and will be ready to keep the optical characteristics.

For the case where the cellulose acylate film has a layered structure composed of three or more layers, the core layer is preferably 30 to 70 µm thick, and more preferably 30 to 60 µm thick. In the film of the present invention, when configured to have a layered structure composed of three of more layers, each of surficial layers on both sides of the film (skin layer A and skin layer B) is preferably 0.5 to 20 µm thick, more preferably 0.5 to 10 µm thick, and particularly 0.5 to 3 µm thick.

(Film Width)

The cellulose acylate film preferably has a width of 700 to 3,000 mm, more preferably 1,000 to 2,800 mm, and particularly 1,300 to 2,500 mm.

1-5. Method of Manufacturing Cellulose Acylate Film

The cellulose acylate film is preferably manufactured by the solvent cast process. Exemplary manufacture of the cellulose acylate film based on the solvent cast process may be referred to the individual specifications of U.S. Pat. No. 2,336,310, ibid. U.S. Pat. No. 2,367,603, ibid. U.S. Pat. No. 2,492,078, ibid. U.S. Pat. No. 2,492,977, ibid. U.S. Pat. No. 2,492,978, ibid. U.S. Pat. No. 2,607,704, ibid. U.S. Pat. No. 2,739,069 and ibid. U.S. Pat. No. 2,739,070, the individual specifications of British Patent Nos. 640731 and 736892, and gazettes of JP-B-S45-4554, JP-B-S49-5614, JP-A-S60-176834, JP-A-S60-203430 and JP-A-S62-115035. The cellulose acylate film may be stretched. Methods and conditions of stretching may be referred, for example, to the individual gazettes of JP-A-S62-115035, JP-A-H04-152125, JP-A-H04-284211, JP-A-H04-298310, and JP-A-H11-48271.

(Methods of Casting)

Known methods of casting the solution includes a method of uniformly extruding the prepared dope through a pressurized die onto a metal support, a doctor-blade method by which the dope is once cast on a metal support, and the thickness of which is then adjusted using a blade, and a method using a reverse roll coater so as to make adjustment with the aid of a reversely rotating roll. The method of using a pressurized die is preferable. The pressurized die includes those of coat hanger type and T-die type, both of them are preferably used. Besides the methods exemplified above, the casting may be conducted by any of various known methods of casting the cellulose triacetate solution, by which effects similar to those described in the individual gazettes may be obtained, by setting the individual conditions taking, for example, a variety in boiling point of the solvents to be used into consideration.

Co-Casting

The cellulose acylate film is preferably formed by laminate casting such as co-casting, sequential casting or coating. In particular, simultaneous co-casting is preferably used, from the viewpoint of stability of manufacturing and saving of production cost.

Figure 3:
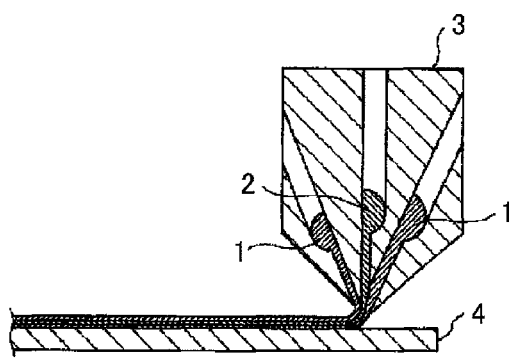
FIG. 3 A schematic diagram illustrating an exemplary process of casting of a three-layered cellulose acylate film by simultaneous co-casting using a simultaneous co-casting die.

Manufacturing based on co-casting or sequential casting begins with preparation of the cellulose acetate solutions (dopes) for the individual layers. In the co-casting (multi-layered simultaneous casting), the dopes for forming the individual layers (which may be three layers or more) are simultaneously extruded through a casting T-die which extrudes the dopes typically through separate slits onto a casting support (band or drum) so as to form the individual layers at the same time, the laminate is separated from the support at an appropriate time, and then dried to obtain the film. FIG. 3 is a cross-sectional view illustrating a process of casting using a co-casting T-die 3, configured to simultaneously extrude a skin layer-forming dope 1 and a core layer-forming dope 2, so as to form three layers on a casting support 4.

The sequential casting is a method by which, first, a casting dope for forming a first layer is extruded for casting through a casting T-die onto the casting support, dried or not dried, a casting dope for forming a second layer is extruded through the casing T-die, further sequentially casing and laminating, if necessary, the dope for forming a third layer and layers thereafter, the laminate is separated at an appropriate time from the support, dried, and shaped. The coating is a method by which, in general, a film for composing the core layer is formed by solution casting, a coating liquid to be coated on the surface is prepared, the coating liquid is coated using an appropriate coating apparatus sequentially on each side, or simultaneously on both sides of the film, and then dried to obtain a film with a layered structure.

An endless loop metal support used for forming the cellulose acylate film is a drum having a mirror-finished surface with chromium plating, or a stainless steel belt (also referred to as band) mirror-finished by surface polishing. A single unit, or two or more units of pressurized die used herein may be installed over the metal support. A single unit or two units are preferably used. When two or more units are installed, the dope to be cast may be divided for the individual units assigned with a variety of fractions, or the dope may be fed to the dies using a plurality of precision metering gear pumps assigned with respective fractions. Temperature of the dope (resin solution) is preferably −10 to 55° C., and more preferably 25 to 50° C. In this case, the solution temperature may be same over the entire process, or may vary from site to site in the process. When the temperature varies, it suffices that a desired temperature is attained immediately before the casting.

While not specifically limited, material for composing the metal support is more preferably SUS (for example, SUS 316).

(Separation)

The method of manufacturing the cellulose acylate film preferably includes a process of separating the dope film from the metal support. Methods of separation in the method of the manufacturing the cellulose acylate film is not specifically limited. Any of publicly known method will successfully improve the separability.

(Stretching)

The method of manufacturing the cellulose acylate film preferably includes a process of stretching the cast film. The cellulose acylate film may be stretched in either direction of machine direction and the direction orthogonal to the machine direction (transverse direction), wherein the direction orthogonal to the machine direction (transverse direction) is preferable, from the viewpoint of a succeeding process of manufacturing of the polarizing plate using the film.

Methods of transverse stretching are described, for example, in JP-A-S62-115035, JP-A-H04-152125, JP-A-H04-284211, JP-A-H04-298310, and JP-A-H11-48271. In the longitudinal stretching, the film may be stretched typically by controlling the speed of film feeding rollers so as to set the taking-up speed faster than the unrolling speed. In the transverse stretching, the film may be stretched by feeding it while being held by a tenter, and by gradually expanding the width of the tenter. The film may alternatively be stretched using a stretching machine after the film is dried (preferably by uniaxial stretching using a long stretching machine).

When the cellulose acylate film is intended to be used as the protective film for the polarizer, for the purpose of suppressing leakage of light when viewed diagonally, it is necessary to align the transmission axis of the polarizer and the in-plane slow axis of the resin film of the present invention in parallel with each other. Since the transmission axis of the polarizer, as manufactured continuously in the form of rolled film, generally lies in parallel with the width-wise direction of the rolled film, so that, in order to continuously bond the polarizer in the form of rolled film, with the protective film composed of the cellulose acylate film again in the form of rolled film, it is necessary for the protective film in the form of rolled film to have the in-plane slow axis laid in parallel with the width-wise direction of the film. Accordingly, the film is preferably stretched more largely in the width-wise direction. The film may be stretched in the middle way of the film-forming process, or may be stretched after being formed and taken up in the form of web.

The factor of transverse stretching is preferably 5 to 100%, more preferably 5 to 80%, and particularly 5 to 40%.

The film may be stretched in the middle way of the film-forming process, or may be stretched after being formed and taken up in the form of web. In the former case, the film may be stretched while keeping therein residual solvent, and is preferably when the amount of residual solvent, given by (Amount of residual solvent)=[(Mass of residual volatile)/(Mass of annealed film)]×100%, falls in the range from 0.05 to 50%. It is particularly preferable to stretch the film with a content of residual solvent of 0.05 to 5%, by a factor of 5 to 80%.

(Drying)

The method of manufacturing a cellulose acylate film preferably includes a step of drying the cellulose acylate film, and a step of stretching the dried resin film of the present invention at a temperature of Tg-10° C. or above, from the viewpoint of good development of retardation.

In the manufacture of the cellulose acylate film, the dope on the metal support may be dried generally by a method of blowing hot air from the top surface side of the metal support (drum or belt), in other words, on the surface of the web on the metal support; a method of blowing hot air from the back surface of the drum or belt; and a back surface fluid heat conduction system in which a temperature-controlled fluid is brought into contact with the back surface, that is, the surface opposite to the surface having the dope cast thereon, of the belt or drum, so as to heat the drum or belt by heat conduction, to thereby control the surface temperature. The back surface fluid heat conduction system is preferable. The surface temperature of the metal support before casting is not specifically limited provided it is not higher than the boiling point of the solvent used in the dope. It is, however preferable to set the temperature 1 to 10° C. lower than the boiling point of a solvent having the lowest boiling point among from the solvents being used, in view of accelerating the drying, and of defluidizing the dope on the metal support. This shall not apply for the case where the cast dope is separated after cooling, but without drying.

The thickness of the film may be adjusted to a desired value, by controlling concentration of solid components contained in the dope, slit gap of base of the die, pressure of extrusion from the die, and feed speed of the metal support.

Length of the thus-obtained cellulose acylate film to be taken up is preferably 100 to 10,000 m per roll, more preferably 500 to 7,000 m, and furthermore preferably 1,000 to 6,000 m. In the process of taking-up, the film is preferably knurled at least on one end, preferably with a width of knurling of 3 mm to 50 mm, and more preferably 5 mm to 30 mm, and preferably with a height of knurling of 0.5 to 500 μm, and more preferably 1 to 200 μm. The knurling may be given by single action or double action.

The cellulose acylate film is particularly suitable for large-screen liquid crystal display devices, since the large-screen display devices generally suffer from degraded contrast and emphasized hue changes in diagonal directions. When intended to be used as an optical compensation film of large-screen liquid crystal display devices, the cellulose acylate film is preferably formed to have a width of, for example, 1,470 mm or wider. The polarizing plate protective film in the present invention includes not only a product form obtained by cutting into size suitable for direct incorporation into the liquid crystal display devices, but also a product form of rolled film obtained by continuous production of a long web and the succeeding taking-up. The polarizing plate protective film of the latter case is stored and transported in this product form, and cut into a desired size when it is actually incorporated into the liquid crystal display devices, or bonded to the polarizer and so forth.

Alternatively, the polarizing plate protect film is bonded, while keeping its web form, with the polarizer and so forth, which is typically composed of polyvinyl alcohol film again in the form of web, and cut into a desired size when they are actually incorporated into the liquid crystal display devices. An exemplary product form of rolled optical compensation film is a roll with a length of 2,500 m or longer.

2. Polarizing Plate

The present invention also relates to a polarizing plate which has at least a polarizer, and the cellulose acylate film of the present invention.

The polarizing plate of the present invention preferably has a polarizer, and the film of the present invention bonded to one surface, or to both surfaces of the polarizer. The polarizer include iodine-containing polarizer, dye-containing polarizer using a dichroic dye, and polyene-based polarizer. The iodine-containing polarizer and the dye-containing polarizer are generally manufactured using a polyvinyl alcohol-based film. When the cellulose acylate film of the present invention is used as the polarizing plate protective film, the polarizing plate may be manufactured by any of general methods without special limitation. In one known method, the obtained cellulose acylate film is treated with an alkali, and then bonded to both surfaces of the polarizer, having been manufactured by immersing a polyvinyl alcohol film into an iodine solution and then stretched, using aqueous solution of a fully saponified polyvinyl alcohol. In place of the alkali treatment, the film may be subjected to easy adhesion treatment such as described in JP-A-H06-94915 and JP-A-H06-118232. The adhesive used for bonding the treated surface of the protective film and the polarizer is exemplified by polyvinyl alcohol-based adhesive such as polyvinyl alcohol and polyvinyl butyral, and vinyl-based latex such as butyl acrylate.

When the cellulose acylate film of the present invention is bonded to the polarizer, it is preferable to align the transmission axis of the polarizer substantially in parallel with the slow axis of the cellulose acylate film of the present invention. In the liquid crystal display device of the present invention, the transmission axis of the polarizing plate and the slow axis of the cellulose acylate film of the present invention are preferably aligned substantially in parallel. "Substantially in parallel" herein means that the direction of the principal refractive index nx of the cellulose acylate film of the present invention falls within a range of deviation of 5° away from the direction of the transmission axis of the polarizing plate, wherein the deviation more preferably falls within an 1° range, and more preferably within a 0.5° range. If the deviation is larger than 1°, the polarizing plates in the crossed Nicol arrangement will unfortunately be degraded in the polarization performance, to cause leakage of light.

The polarizing plate of the present invention includes not only a product form obtained by cutting into size suitable for direct incorporation into the liquid crystal display device, but also a product form of rolled film obtained by continuously producing a long web and then taking it up (for example, a roll of 2,500 m long or longer, and a roll of 3,900 m long or longer). When intended to be used in large-screen liquid crystal display devices, the polarizing plate is preferably formed to have a width of 1,470 mm or wider. Configuration of the polarizing plate of the present invention is arbitrarily selectable from those publicly known, without special limitations. For example, a configuration illustrated in FIG. 6 of JP-A-2008-262161 is adoptable.

3. Liquid Crystal Display Device

The present invention also relates to a liquid crystal display device which has a liquid crystal cell, and the polarizing plate of the present invention.

The liquid crystal display device of the present invention has a liquid crystal cell, and a pair of polarizing plates disposed on both sides of the liquid crystal cell, and is preferably IPS, OCB, or VA-mode liquid crystal display device in which at least one of the polarizing plates is configured by the polarizing plate of the present invention. A typical internal configuration of the liquid crystal display device was illustrated in FIG. 2. Specific configuration of the liquid crystal display device of the present invention is arbitrarily selectable from those publicly known, without special limitations. Also a configuration illustrated in FIG. 2 of JP-A-2008-262161 is preferably used.

EXAMPLE

The present invention will further be detailed below referring to Examples. It should, however, be understood that the present invention is not construed as being limited thereto.

Exemplary Synthesis 1

Into an autoclave, 100 parts by mass of phenol-modified C9 petroleum resin "Neopolymer E-100" (Gardner color scale=15, hydroxyl value=68 mg KOH/g, softening point=90° C., from Nippon Petrochemicals Co., Ltd.) and 0.5 parts by mass of nickel-diatomite catalyst (containing 50% nickel and 0% calcium) prepared by the precipitation process were put, and a hydrogenation reaction was allowed to proceed under conditions including a partial pressure of hydrogen of 200 Kg/cm$^2$, a reaction temperature of 275° C., and a reaction time of 5 hours. Upon completion of the reaction, the obtained resin was dissolved into 300 parts by mass of cyclohexane, from which the catalyst was removed by filtration. The filtrate was then put in an one-liter separable flask equipped with a stirring blade, a condenser, a thermometer, a temperature controller and a pressure gauge, the system was gradually heated up to 200° C. and evacuated down to 20 torr so as to remove the solvent, to thereby obtain 99 parts by mass of phenol-modified C9 hydrogenated petroleum resin (A-01), with a degree of hydrogenation of olefin of 100%, a degree of hydrogenation of aromatic ring of 21%, a hydroxyl value of 42 mg KOH/g, and a softening point of 90° C.

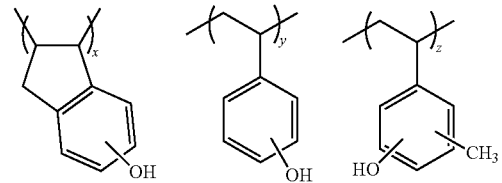

Exemplary Synthesis 2-4

Polymers (A-02) to (A-04) were obtained in the same way as described in Exemplary Synthesis 1, except that "Neopolymer E-100" was replaced with the resins listed in Table 1.

Exemplary Synthesis 5

Thirty grams of the hydrogenated resin (A-01) obtained in Exemplary Synthesis 1 was dissolved into 70 g of acetone.

The solution was then poured into 500 mL of methanol, filtered by suction filtration to remove a precipitated matter, and the filtrate was collected. The collected solution was evaporated off under reduced pressure to obtain 8.2 g of the polymer (A-05).

Exemplary Syntheses 6 to 8

Polymers (A-06) to (A-08) were obtained in the same way as described in Exemplary Synthesis 5, except that (A-01) was replaced respectively with (A-02) to (A-04).

Exemplary Synthesis 9

Into a 300-ml, three-necked flask equipped with a stirrer, a thermometer, a reflux condenser and a nitrogen gas introducing pipe, 20.0 g of methyl ethyl ketone was put and heated to 80° C. Next, a mixed solution composed of 32.9 g of p-hydroxystyrene, 7.1 g of styrene, 20.0 g of methyl ethyl ketone, and 4.00 g of "V-601" (from Wako Pure Chemical Industries, Ltd.) was dropped at a constant rate so as to complete the dropping in 3 hours. Upon completion of the dropping, the mixture was stirred for one hour, (1) a solution composed of 0.50 g of "V-601" and 1.0 g of methyl ethyl ketone was added, and the mixture was stirred for 2 hours. Then the process (1) was repeated twice, the mixture was further stirred for 2 hours, poured into one liter of n-hexane followed by drying, to thereby obtain 39.5 g of methyl isopropenyl ketone polymer (A-09). The polymer was found to have a weight-average molecular weight (Mw) of 2,200 (calculated as a polystyrene equivalent value by gel permeation chromatography (GPC), using columns of TSK gel Super HZM-H, TSK gel Super HZ4000 and TSK gel Super HZ200 (from Tosoh Corporation)).

Exemplary Synthesis 10

Polymer (A-10) was obtained in the same way as described in Exemplary Synthesis 1, except that the monomer and the amount of use thereof in the polymerization in Exemplary Synthesis 9 were altered into 0.5 g of p-hydroxystyrene and 39.5 g of styrene.

Exemplary Syntheses 11 and 12

Polymers (A-11) to (A-12) were obtained in the same way as described in Exemplary Synthesis 1, except that "Neopolymer E-100" in Exemplary Synthesis 1 was altered into (A-09) and (A-10) respectively. The hydroxyl value of (A-11) was found to be 392 mg KOH/g, and the hydroxyl value of (A-12) was found to be 6 mg KOH/g.

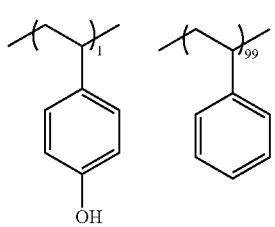

(A-10)

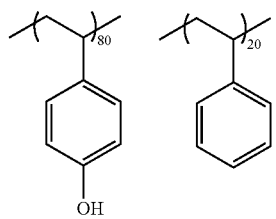

(A-09)

Comparative Synthesis 1

Exemplary Compound (AH-01) shown below was obtained according to a method described in paragraph [0181] of JP-A-2009-126899.

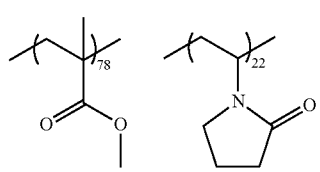

(AH-01)

Example 1 and Comparative Example 1

(1) Formation of Cellulose Acylate Film

<Preparation of Cellulose Acylate>
Cellulose acylate with a degree of acetyl substitution of 2.87 was prepared. This was obtained by an acylation reaction at 40° C., by adding sulfuric acid as a catalyst (7.8 parts by mass per 100 parts by mass of cellulose) and a carboxylic acid as a source of acyl substituent. The acylation was followed by aging at 40° C. Low molecular weight components in the cellulose acylate was removed by washing with acetone.
<Preparation of Skin Layer-Forming Dope 101>
(Preparation of Cellulose Acylate Solution)
The composition below was put in a mixing tank, and the individual components were dissolved under stirring, to prepare a cellulose acylate solution 1.

| Composition of Cellulose Acylate Solution 1 | |
|---|---|
| Cellulose acetate, with degree of acetyl substitution = 2.87, degree of polymerization = 370 | 100.0 parts by mass |
| Triphenyl phosphate | 8.0 parts by mass |
| Phenyl diphenyl phosphate | 4.0 parts by mass |
| Methylene chloride (first solvent) | 353.9 parts by mass |
| Methanol (second solvent) | 89.6 parts by mass |
| n-Butanol (third solvent) | 4.5 parts by mass |

(Preparation of Matting Agent Solution 2)
The composition below was put in a disperser, and the individual components were dissolved under stirring, to prepare a matting agent solution 2.

| Composition of Matting Agent Solution 2 | |
|---|---|
| Silica particle, with average particle size = 20 nm (Aerosil R972, from Nippon Aerosil Co., Ltd.) | 2.0 parts by mass |

-continued

| Composition of Matting Agent Solution 2 | |
|---|---|
| Methylene chloride (first solvent) | 69.3 parts by mass |
| Methanol (second solvent) | 17.5 parts by mass |
| n-Butanol (third solvent) | 0.9 parts by mass |
| Cellulose acylate solution 1 | 0.9 parts by mass |

(Preparation of UV Absorber Solution 3)

The composition below was put in a mixing tank, stirred under heating so as to dissolve the individual components, to thereby prepare a UV absorber solution 3.

| Composition of UV Absorber Solution 3 | |
|---|---|
| UV absorber C, shown below | 20.0 parts by mass |
| Methylene chloride (first solvent) | 61.0 parts by mass |
| Methanol (second solvent) | 15.4 parts by mass |
| n-Butanol (third solvent) | 0.8 parts by mass |
| Cellulose acylate solution 1 | 12.8 parts by mass |

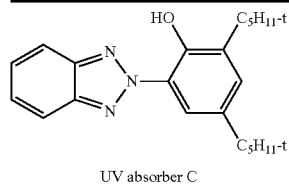

UV absorber C

After being respectively filtered, 1.3 parts by mass of the matting agent solution 2 and 3.4 parts by mass of the UV absorber solution 3 were mixed using an inline mixer, further added with 95.3 parts by mass of the cellulose acylate solution 1, and the mixture was mixed using an inline mixer, to thereby prepare a skin layer-forming solution 101.

<Preparation of Base Layer-Forming Dope 101>

(Preparation of Cellulose Acylate Solution)

The composition below was put into a mixing tank, stirred to dissolve the individual components, to thereby prepare a dope for forming the base layer.

| Composition of Cellulose Acylate Solution 2 | |
|---|---|
| Cellulose acetate, with degree of acetyl substitution = 2.87, degree of polymerization = 370 | 100.0 parts by mass |
| Hydrogenated resin (A-01) | 43.0 parts by mass |
| UV absorber C | 2.0 parts by mass |
| Methylene chloride (first solvent) | 297.7 parts by mass |
| Methanol (second solvent) | 75.4 parts by mass |
| n-Butanol (third solvent) | 3.8 parts by mass |

<Casting>

Using a drum casting apparatus, the thus prepared dope (base layer-forming dope) and the skin layer-forming dope positioned on both sides thereof were uniformly cast through a casting port on a stainless steel casting support (kept at support temperature −9° C.) so as to implement three-layer simultaneous casting. The laminate, while retaining approximately 70% by mass of residual solvent in the dopes composing the individual layers, was separated, fixed at both ends in the width-wise direction thereof using a pin tenter, stretched 1.28 times in the transverse direction while retaining the residual solvent content of 3 to 5% by mass, and concurrently dried. The laminate was further dried while being allowed to pass through rolls of an annealing apparatus, to thereby obtain a cellulose acylate film 101 of Example. The thus obtained cellulose acylate film 101 was found to be 60 μm thickness, and 1480 mm wide.

Polarizing plate protective films of Examples 102 to 112 and Comparative Examples C11 to C14 were manufactured in the same way as the film 101, except that species and/or amount of use of the compound were altered as listed in Table 1, rather than using the polymer (A-01). Results of evaluation of the individual items, made on the individual films, are listed in Table 1.

[Evaluation]

(Measurement of Photoelastic Coefficient)

Each film was cut into pieces of 3.5 cm×12 cm in size, Re values under the individual load values of 0 g, 250 g, 500 g, 1,000 g and 1,500 g were measured using an ellipsometer (M150, from JASCO Corporation), and photoelastic coefficient was determined based on the slope of a straight line representing a relation between stress and Re. Results of evaluation based on the criteria below were shown in Table below.

A: smaller than $6.0 \times 10^{-12}$ $Pa^{-1}$;
B: $6.0 \times 10^{-12}$ to $8.0 \times 10^{-12}$ $Pa^{-1}$; and
C: larger than $8.0 \times 10^{-12}$ $Pa^{-1}$.

(Measurement of Moisture Content)

The specimens were conditioned at 25° C. and 80% relative humidity for 24 hours, and equilibrium moisture content was measured using a Karl Fischer moisture titrator AQ-2000 from Hiranuma Sangyo Corporation:

A: moisture content is less than 3%;
B: moisture content is 3% or more and less than 5%;
C: moisture content is 5% or more and less than 6%; and
D: moisture content is more than 6%.

(Measurement of Haze)

Haze of the film specimens of 40 mm×80 mm in size was measured in an environment at 25° C. and 60% relative humidity, using a haze meter (HGM-2DP, from Suga Test Instruments Co., Ltd.), in compliance with JIS K-6714.

A: haze is 0.5% or smaller;
B: haze is larger than 0.5% and 1% or smaller;
C: haze is larger than 1% and 3% or smaller; and
D: haze is larger than 3%.

TABLE 1

| | (Co)polymer | | | | Evaluation | | | |
|---|---|---|---|---|---|---|---|---|
| No. | Species | Source resin | Weight-average molecular weight | Amount of addition in base layer a) | Photoelastic coefficient | Moisture content | Haze | Remark |
| 101 | A-01 | Neopolymer E-100[d] | 800 | 43 | A | A | B | Invention |
| 102 | A-02 | TA-120[e] | 920 | 43 | A | A | B | Invention |
| 103 | A-03 | H-100[f] | 670 | 43 | A | A | B | Invention |

TABLE 1-continued

| | | (Co)polymer | | | Evaluation | | | |
|---|---|---|---|---|---|---|---|---|
| No. | Species | Source resin | Weight-average molecular weight | Amount of addition in base layer a) | Photoelastic coefficient | Moisture content | Haze | Remark |
| 104 | A-04 | V-120S[f] | 900 | 43 | A | A | B | Invention |
| 105 | A-05 | Neopolymer E-100[d] | 450 | 43 | A | A | A | Invention |
| 106 | A-06 | TA-120[e] | 590 | 25 | A | A | A | Invention |
| 107 | A-07 | H-100[f] | 460 | 50 | A | B | A | Invention |
| 108 | A-08 | V-120S[f] | 550 | 30 | A | A | A | Invention |
| 109 | A-02 | TA-120[e] | 920 | 0.05 | B | B | A | Invention |
| 110 | A-04 | V-120S[f] | 900 | 400 | A | A | C | Invention |
| 111 | A-11 | A-09 | 2200 | 43 | B | C | B | Invention |
| 112 | A-12 | A-10 | 2100 | 43 | B | B | C | Invention |
| C11 | None | — | — | — | C | D | A | Comparative Example |
| C12 | AH-01 | — | 10000 | 43 | C | D | D | Comparative Example |
| C13 | Quintone 1700[b] | — | 600 | 43 | C | D | D | Comparative Example |
| C14 | PVP K-30[c] | — | 40000 | 43 | B | D | D | Comparative Example | a) amount of addition per 100 parts by mass of cellulose acylate
[b] from Nippon Shokubai Co., Ltd.
[c] from Mitsubishi Rayon Co., Ltd.
[d] from JX Nippon Mining and Metals Corporation
[e] from Heisen Yoko Co., Ltd.
[f] from Nitto Chemical Co., Ltd.

From the results shown in Table 1, the films of the present invention (Examples), which contains the polymer containing the repeating unit derived from the monomer represented by the formula (1), were found to show small values both in the photoelastic coefficient and moisture content and show low haze, and were preferable.

This is supposedly because the polymer which contains the repeating unit derived from the monomer represented by the formula (1) has an appropriate degree of freedom in the side chain thereof, so that the hydroxyl groups of the polymer can more effectively interact with the glucopyranose rings of cellulose. It is also predicted that, with an appropriate weight-average molecular weight, the polymer became more accessible at around the principal chain of the cellulose acylate to further enhance the hydrophobicity, and thereby the effect was developed more distinctively.

The film C11 of Comparative Example, which relates to an embodiment containing no polymer of the present invention, was found to be inferior to the films of the present invention both in terms of moisture content and photoelastic coefficient.

The films C12 and C14 of Comparative Examples, which relate to an embodiment of using a copolymer used in Example of JP-A-2009-126899, and an exemplified polymer, were found to be inferior to the films of the present invention, in terms of the performances described above. The film C13 of Comparative Example, which relates to an embodiment using a C5-based (cyclopentadiene-based) hydroxyl group-containing hydrogenated petroleum resin, was again found to be inferior to the films of the present invention in terms of the performances described above.

Example 2 and Comparative Example 2

(2) Manufacture of Polarizing Plate

[Saponification of Polarizing Plate Protective Film]

The thus manufactured polarizing plate protective film of Example 1 was immersed in a 2.3 mol/L aqueous sodium hydroxide solution at 55° C. for 3 minutes. The protective film was washed in a water washing bath at room temperature, and then neutralized at 30° C. using a 0.05 mol/L sulfuric acid. The polarizing plate protective film was again washed in a water washing bath at room temperature, and dried under hot air at 100° C. The surface of the polarizing plate protective film of Example 1 was thus saponified.

[Manufacture of Polarizing Plate]

A polarizer was manufactured by allowing the stretched polyvinyl alcohol film to adsorb iodine.

The saponified polarizing plate protective film 101 of Example 1 was bonded to one surface of the polarizer using a polyvinyl alcohol-based adhesive. A commercially available cellulose triacetate film (Fujitac TD80UF, from FUJIFILM Corporation) was saponified in the same way, and bonded to the surface of the polarizer, which is opposite to the surface having already bonded with the polarizing plate protective film manufactured in Example 1, using a polyvinyl alcohol-based adhesive.

The polarizer and the polarizing plate protective film manufactured in Example 1 were arranged so as to align the transmission axis of the former orthogonal to the slow axis of the latter. Also the polarizer and the commercially available cellulose triacetate film were arranged so as to align the transmission axis of the former orthogonal to the slow axis of the latter.

A polarizing plate 201 of Example was manufactured in this way.

Also the polarizing plate protective films configured by the films 102 to 110, and the polarizing plate protective films configured by the films C11 to C15 in Comparative Examples were respectively saponified and used to manufacture the polarizing plates in the same way. Polarizing plates 202 to 212, and C21 to C24 of Examples and Comparative Examples were manufactured in this way.

Example 3 and Comparative Example 3

Manufacture of Liquid Crystal Display Device

Figure 2:
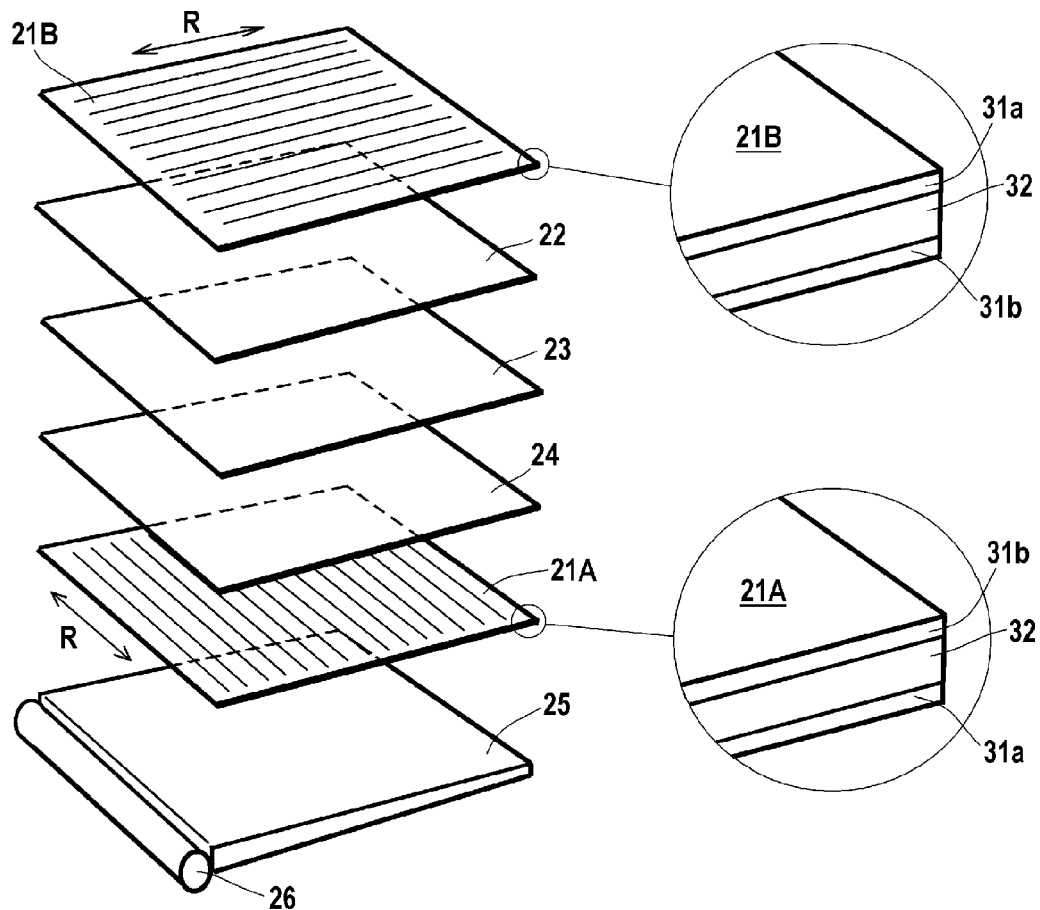
FIG. 2 An exploded perspective view schematically illustrating an internal structure of a liquid crystal display device.

A polarizing plate on the viewer's side of a commercially available liquid crystal television set (Bravia J5000 from SONY Corporation) was peeled off, and the polarizing plate 201 of the present invention, having the polarizing plate protective film 101 incorporated therein, was bonded via an adhesive so as to direct the polarizing plate protective film of Example to the liquid crystal cell (the film 31b in FIG. 2). The transmission axis of the polarizing plate on the viewer's side was aligned vertically. The configuration is as schematically illustrated in FIG. 2, wherein the liquid crystal display device manufactured herein has, from the lower to the upper in the drawing, a light source 26, a light guide plate 25, a first polarizing plate 21A (a polarizer 32, polarizing films 31a, 31b), an array substrate 24 having an alignment film and a translucent electrode, a liquid crystal layer 23, a color filter substrate 22 having an alignment film and a translucent electrode, and a polarizing plate 21B. As described above, the protective film 31b of the second polarizing plate 21B is configured by the films of Examples and Comparative Examples replaced from the original.

Liquid crystal display devices 302 to 312, and C31 to C34 of the individual Examples and Comparative Examples were manufactured in the same way, except that the protective films and the polarizing plates of other Examples, and polarizing plate protective films and the polarizing plates of other Comparative Examples were respectively used.

EXPLANATION OF SYMBOLS 1 skin layer-forming dope
2 core layer-forming dope
3 co-casting T-die
4 casting support
21A, 21B polarizing plate
22 color filter substrate
23 liquid crystal layer
24 array substrate
25 light guide plate
31a, 31b cellulose acylate film (protective film)
32 light guide plate

The invention claimed is:
1. A cellulose acylate film comprising at least a cellulose acylate and a resin produced by hydrogenating a polymer containing a repeating unit derived from a monomer represented by the formula (1) below and hydroxyl group:

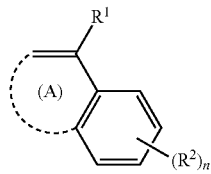

(1)

in the formula (1), $R^1$ represents a hydrogen atom or $C_{1-5}$ alkyl group; each $R^2$ represents a hydrogen atom or substituent, at least one of $(R^2)$s being a hydroxyl group-containing substituent; moiety (A) may form, or does not necessarily form, a five- or six-membered ring; n represents an integer of 1 to 5, and when n is 2 or larger, the plurality of $(R^2)$s may be same with or different from each other,
wherein the cellulose acylate film has a photoelastic coefficient of $8.0 \times 10^{-12}\,Pa^{-1}$ or smaller, a haze of 0.5% or smaller, and a moisture content at 25° C. and 80% relative humidity of 5% or less, and
wherein the resin is obtained by reprecipitation in addition to removal of a catalyst on completion of the hydrogenation reaction of the polymer.

2. The cellulose acylate film of claim 1, wherein the resin is a copolymer which contains one or more species of the repeating units represented by the formula (1), and contains repeating units derived from two or more different species of monomers.

3. The cellulose acylate film of claim 1, comprising the repeating unit derived from a monomer represented by the formula (1), in which the unsaturated ethylenic bond in the moiety (A) does not link with the aromatic ring to thereby form no cyclic structure.

4. The cellulose acylate film of claim 1, wherein $R^1$ represents a hydrogen atom or methyl group.

5. The cellulose acylate film of claim 1, wherein the resin has a hydroxyl value of 10 to 200 mg/KOH/g.

6. The cellulose acylate film of claim 1, wherein the resin has a weight-average molecular weight of 200 to 5,000.

7. The cellulose acylate film of claim 5, wherein the resin has a weight-average molecular weight of 200 to 5,000.

8. The cellulose acylate film of claim 1, wherein the cellulose acylate satisfies the degree of acyl substitution given by the equation below:

$$1.5 \leq A \leq 3.0$$

wherein A represents the degree of acyl substitution.

9. The cellulose acylate film of claim 5, wherein the cellulose acylate satisfies the degree of acyl substitution given by the equation below:

$$1.5 \leq A \leq 3.0$$

wherein A represents the degree of acyl substitution.

10. The cellulose acylate film of claim 6, wherein the cellulose acylate satisfies the degree of acyl substitution given by the equation below:

$$1.5 \leq A \leq 3.0$$

wherein A represents the degree of acyl substitution.

11. The cellulose acylate film of claim 1, wherein the cellulose acylate satisfies the degree of acyl substitution given by the equation below:

$$1.5 \leq A \leq 3.0$$

wherein A represents the degree of acyl substitution.

12. The cellulose acylate film of claim 1, wherein the cellulose acylate satisfies the degree of acetyl substitution given by the equation below:

$$2.0 \leq B \leq 3.0$$

wherein B represents the degree of acetyl substitution.

13. The cellulose acylate film of claim 5, wherein the cellulose acylate satisfies the degree of acetyl substitution given by the equation below:

$$2.0 \leq B \leq 3.0$$

wherein B represents the degree of acetyl substitution.

14. The cellulose acylate film of claim 6, wherein the cellulose acylate satisfies the degree of acetyl substitution given by the equation below:

$$2.0 \leq B \leq 3.0$$

wherein B represents the degree of acetyl substitution.

15. The cellulose acylate film of claim 1, wherein the cellulose acylate satisfies the degree of acetyl substitution given by the equation below:

$$2.0 \leq B \leq 3.0$$

wherein B represents the degree of acetyl substitution.

16. A polarizing plate comprising at least a polarizer, and the cellulose acylate film of claim 1.

17. A liquid crystal display device comprising at least a liquid crystal cell, and the polarizing plate of claim 16.

* * * * *